(12) United States Patent
Al-Farhood

(10) Patent No.: US 8,629,234 B2
(45) Date of Patent: Jan. 14, 2014

(54) PROCESS FOR SYNTHESIZING A NEW CATALYST COMPLEX FOR THE PRODUCTION OF POLYETHYLENE TEREPHTHLATE

(71) Applicant: Saudi Basic Industries Corporation, Riyadh (SA)

(72) Inventor: Bander Al-Farhood, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 13/716,555

(22) Filed: Dec. 17, 2012

(65) Prior Publication Data

US 2013/0158227 A1    Jun. 20, 2013

(30) Foreign Application Priority Data

Dec. 16, 2011    (EP) .................................... 11009910

(51) Int. Cl.
*C08G 64/00* (2006.01)
*C08G 63/02* (2006.01)

(52) U.S. Cl.
USPC ............ 528/271; 528/193; 528/194; 528/272

(58) Field of Classification Search
USPC ................... 528/193, 194, 271, 272
See application file for complete search history.

(56) References Cited

U.S. PATENT DOCUMENTS

| | | | |
|---|---|---|---|
| 2,850,483 A | 9/1958 | Ballentine et al. | |
| 2,973,339 A | 2/1961 | Muenster et al. | |
| 3,047,536 A | 7/1962 | Gordon | |
| 3,133,113 A | 5/1964 | Malkemus | |
| 3,530,098 A | 9/1970 | Schweizer | |
| 5,017,680 A | 5/1991 | Sublett | |
| 6,133,404 A | 10/2000 | Kang et al. | |
| 6,489,433 B2 | 12/2002 | Duan et al. | |
| 2005/0107576 A1 * | 5/2005 | Hori et al. ..................... | 528/275 |
| 2008/0033084 A1 | 2/2008 | Bashir et al. | |

FOREIGN PATENT DOCUMENTS

| | | |
|---|---|---|
| BE | 527901 A | 4/1954 |
| EP | 1574539 A1 | 9/2005 |
| GB | 804495 A | 11/1958 |
| GB | 805534 A | 12/1958 |
| JP | 56008431 A | 1/1981 |
| JP | 2155920 A | 6/1990 |
| WO | 0142335 A1 | 6/2001 |
| WO | 2010002795 A1 | 1/2010 |
| WO | 2011020619 A1 | 2/2011 |

OTHER PUBLICATIONS

Japanese Patent No. 2155920 (A); Publication Date: Jun. 15, 1990; Abstract Only; 2 Pages.
Japanese Patent No. 56008431 (A); Publication Date: Jan. 28, 1981; Abstract Only; 1 Page.
Extended European Search Report; European Application No. 11009910.8; Date of Mailing: May 12, 2012; 5 Pages.
Billmeyer, Jr.; "Methods for Estimating Intrinsic Viscosity"; Journal of Polymer Science; vol. 4; 1949; pp. 83-86.
Chen et al.; Kinetics of Diethylene Glycol Formation from Bishydroxyethyl Terephthalate with Zinc Catalyst in the Preparation of Poly(ethylene terephthalate); Journal of Applied Polymer Science; vol. 75; 2000; pp. 1229-1234.
Ramasubramanian et al.; "Rapid Transesterification of Aliphatic and Aromatic Esters Using Sodium Bis (ethylenedioxy)borate—A Mild Catalyst"; Asian Journal of Chemistry; vol. 23, No. 8; 2011; pp. 3660-3662.
Tomita; "Studies on the Formation of Poly(ethylene terephthalate): 6. Catalytic Activity of Metal Compounds in Polycondensation of Bis(2-hydroxyethyl) terephthalate"; Polymer; vol. 17; Mar. 1976; pp. 221-224.

* cited by examiner

*Primary Examiner* — Terressa Boykin
(74) *Attorney, Agent, or Firm* — Cantor Colburn LLP

(57) ABSTRACT

This invention relates to a process of preparing a catalyst for the production of polyethylene terephthalate and for the production of high molecular weight PET comprising:
a) reacting boric acid and a zinc salt in a solvent comprising at least one glycol selected from ethylene glycol, propylene glycol, and butylene glycol thereby forming a precipitate; and
b) isolating the precipitate.

In addition, the use of the catalyst for the production of polyethylene terephthalate and for the production of high molecular weight PET is disclosed.

15 Claims, No Drawings

PROCESS FOR SYNTHESIZING A NEW CATALYST COMPLEX FOR THE PRODUCTION OF POLYETHYLENE TEREPHTHLATE

This invention relates to the synthesis of a new catalyst for the polymerization of polyethylene terephthalate (PET). The invention also relates to a catalyst obtainable by the said process. Furthermore, the invention relates to a process for the production of polyethylene terephthalate (PET) using said catalyst and in particular for the production of high molecular weight polyethylene terephthalate (PET).

Polyesters like PET are well-known in the art, and are widely used for applications like textile and industrial fibers, films and sheets, and containers. Polyesters can be synthesized from the reaction between a dicarbonicacid and a diol in a mole ratio of 1:1 followed by two steps. The first step is called "esterification" carried out at a high temperature followed by a condensation reaction at low pressure and higher temperature, this step commonly known as "polycondensation" step.

PET can be synthesized via the reaction between dimethyl terephthalate (DMT) and ethylene glycol (EG) at high temperature, typically between 150 and 200° C. Catalysts such as zinc acetate or manganese acetate have been used to accelerate the reaction. Another way of synthesizing PET is the reaction of purified terephthalic acid (PTA) instead of dimethyl terephthalate with ethylene glycol. For that reaction a catalyst is not required. That reaction represents an esterification that leads to the formation of an intermediate ester material called bis-(2-hydroxyethyl)terephthalate (BHET). BHET can subsequently be polymerized (polycondensed) in the presence of a suitable catalyst at high temperature, typically between 270 and 300° C., and in an inert atmosphere or under high vacuum to produce PET.

PET synthesis is not free of side reactions. The formation of diethylene glycol (DEG) and acetaldehyde (AA) are important side reactions in preparing PET. DEG is formed via condensation of two EG molecules and can be incorporated in the PET chain. The amount of DEG in PET molecules influences many important properties of PET such as melting point, glass transition temperature, dyeability and light stability. Acetaldehyde is generated from the reactions of vinyl end-group with the traces of water, —OH or EG end groups. Acetaldehyde causes a non-favorable taste of the bottled water. When selecting a catalyst for the polymerization it is desirable that such catalyst reveals a selectivity toward the desired reaction and minimizes the side reactions.

As stated above, polycondensation of PET occurs in the presence of a catalyst. Typical catalysts used in industry are antimony based materials. Antimony trioxide and antimony triacetate are the antimony compounds most commonly used. Antimony-based catalysts show good catalytic efficiency, low costs and are often used in the presence of phosphorus compounds as a stabilizer. Antimony is a heavy metal and hence the toxicity of free metal contained in the polymer after the polymerization is a key issue in particular for food packaging applications. Alternative metal compounds have been tried to replace antimony but in most cases their catalytic activity is inadequate for commercial exploitation.

Germanium oxide is also widely used as a catalyst for the manufacture of PET and shows even higher activity than antimony; it is mainly used in Japan due to the restrictions caused by the toxicity of antimony. The higher cost of germanium has limited its world-wide usage. The use of germanium based catalysts for the manufacture of PET is described e.g. in JP 56008431A and JP 07081002B2.

An alternative commercially applied group of catalysts which has been used for the manufacture of PET are titanium compounds. Titanium shows often higher activity than both antimony and germanium. However, when titanium catalysts are used for carrying out the polycondensation in the solid state reaction it is very difficult to produce high molecular weight products. Discoloration of the final product is a further major disadvantage of using titanium compounds. Color masking agents which are added to improve the color of the polymer increase the costs for the production of PET. Numerous improvements are in progress to produce titanium compounds suitable for PET polymerization, examples can be found in U.S. Pat. No. 5,017,680.

Also zinc compounds are described as polycondensation catalysts. Zinc based catalysts show high activity in the melt polycondensation and they exhibit no toxicity and the lower cost of such compounds gives an extra advantage. However, zinc compounds are currently hardly used in the industry because of side reactions such as high diethylene glycol (DEG) formation [Chen, L-W. and Chen, J-W. Journal of Applied Polymer Science, 2000, 75(10), 1229-1234], high acetaldehyde (AA) content of the products [WO2010102795A1 and WO2011020619A1] and low thermal stability [Polymer, 1976, 17, 221-224]. In addition, they have lower activity during the solid state polymerization similar to that of titanium catalysts. Examples of zinc based catalysts are described in U.S. Pat. No. 6,133,404 and U.S. Pat. No. 6,489,433.

Specifically, zinc borates in different forms are suggested in the patent literature as polycondensation catalysts. Organic borates and their metal salts are also described to act as PET catalysts. For example, Zinc borates have been used in the PCT publication WO 01/42335A1 as a polycondensation catalyst. Standard zinc borate is used as primary catalyst for polyester production as an assisting agent for example in the patent applications GB804495, U.S. Pat. No. 2973339, BE527901, U.S. Pat. No. 3,133,113A and U.S. Pat. No. 3,047,536A. Another alternative of a borate based catalyst is described in the Asian Journal of Chemistry, Vol 23, No. 8 (2011), 3660-3662, where a catalyst system for the mild transesterification of aliphatic and aromatic esters using sodium bis(ethylenedioxy)borate is described.

However, such catalysts are showing slow reaction rates and/or discoloration of the polymer.

Therefore, it is the objective of this invention to find a new catalyst system that results in PET showing a good balance of mechanical and optical properties, and which results in reduced amounts of metal residues, especially less heavy metals, in the PET produced with such catalysts. At the same time such catalyst should exhibit a fast reaction rate and high activity.

According to the instant invention we have found a new process of preparing a catalyst for the production of polyethylene terephthalate comprising the following steps:
   a) reacting boric acid and a zinc salt in a solvent comprising one or more glycols selected from the group consisting of ethylene glycol, propylene glycol and butylene glycol thereby forming a precipitate; and
   b) isolating the precipitate resulting from step a).

In the process according to the invention for making the new catalyst, boric acid and a zinc salt are allowed to react with each other in the presence of a glycol comprising solvent. That glycolic solvent may either comprise a single glycol such as ethylene glycol, propylene glycol or butylene glycol, but also any combinations thereof can be used. Preferably, the solvent comprises ethylene glycol. The solvent comprising one or more glycols can further contain other inert organic solvents or water. In particular water is a preferred further component of the solvent because zinc salts are usually easily soluble in water so that a mixture of one or more of the mentioned glycols with water is in particular preferred as solvent for the reaction of step a).

With regard to the zinc salt the process is very flexible. Any zinc salt that can be solved in the glycolic solvent can be suitably applied in the reaction. Preferred zinc salts are those which do not introduce any toxic ions or ligands. Zinc salts with organic ligands such as anions of organic acids are easily soluble in glycolic solvents and are thus preferably applied in the inventive process. Examples of Zinc salts with organic ligands include zinc acetate dihydrate and zinc formate. The most preferred zinc salt is zinc acetate dihydrate. Inorganic zinc salts such as zinc chloride can also be used.

The order of combining the reaction components is not critical. For example, boric acid can be first dissolved in excess glycolic solvent and then added to pre-dissolved zinc acetate dihydrate in the glycolic solvent. But it is as well possible to add the zinc solution to the solution of the boric acid. It is also possible to add the zinc salt in solid form to a solution of boric acid in the glycolic solvent. If the suspension is stirred the zinc salt will dissolve so that the reaction with the boric acid can occur. In particular if the zinc salt is added in highly concentrated solution it may be preferable to solve the zinc salt in water and to add the aqueous solution to the boric acid solution.

According to the invention a process is preferred, wherein the boric acid is solved in the solvent comprising one or more of the glycols and the zinc salt is combined with such solution either in solid form or in the form of a solution in the solvent comprising one or more glycols or in water.

The concentrations of the boric acid and the zinc salt in the respective solvents can be broadly varied. The upper limit of the concentrations of the reactants is the saturation limit in the respective solvent. Good results are obtained if the solutions of the boric acid and the zinc salt are in the range between 0.01 mol/l and the saturation limit. Preferably the concentrations are between 0.05 mol/l and 1 mol/l, more preferably between 0.1 and 0.5 mol/l.

The reaction can occur in any container, which can contain the reaction mixture and allow the reaction to proceed. It is of course preferred to perform the reaction in a container which can be stirred and which allows for a control of the temperature. Any stirred reaction tanks commonly used in the chemical industry are suitable for the inventive process. Preferably, the reaction mixture is stirred because that results in a higher yield of the desired catalyst and a higher reaction rate. A variety of conventional methods can be employed to recover the reaction product, for example boiling off the un-reacted solvent or decanting the solvent from the precipitate formed during the reaction. Preferably, the resulting precipitate is isolated by decanting the glycolic solvent followed by drying. Before drying, it is preferred to wash the product with warm water several times followed by filtration. The drying can be performed at a temperature ranging from 80-200 deg C. in an open atmosphere or under flow of inert gas or under vacuum.

The reaction may be performed in an open atmosphere but a preferred embodiment of the invention is a process, wherein the reaction between the boric acid and the zinc salt is performed under inert atmosphere. Methods to perform reactions under inert atmosphere are well known to a person skilled in the art. Most convenient is to perform the reaction under nitrogen atmosphere, but also any other inert gas like e.g. Argon can be used.

The temperature of the reaction can be varied in a broad range. The reaction can be performed at ambient temperature, however, higher reaction temperatures are usually preferred because at higher temperatures the solubility of the reactants in the glycolic solvent and also the reaction rate is increased. Preferred is a process, wherein the reaction between the boric acid and the zinc salt is performed at a temperature of from 100° C. to the boiling temperature of the solution. More preferably, the reaction is carried out at a temperature of from 120° C. to the boiling point of the solution, most preferably at about 140° C.

The molar ratio between the boric acid and the zinc salt can also be varied in broad ranges. The highest yield of the new catalysts is obtained if the molar excess of the zinc salt is about two fold. Preferred in accordance with the instant invention is a process, wherein the molar ratio between boric acid and zinc is between 0.3 and 0.7. Also a respective molar ratio between 0.1 and 1.0 results in reasonable yields of the new catalyst. The process according to the instant invention results in a new catalyst. Hence further to the new process we have found a new catalyst for the production of polyethylene terephthalate obtainable by the process described above. The precipitate formed according to the process of this invention is not necessarily a homogenous chemical compound and even without further purification the precipitate can well be applied as catalyst for the production of PET. However among other compositions possibly being present in the precipitate the main component reveals a chemical composition matching the formula $C_4H_8O_9B_2Zn_4$. Hence according to a preferred embodiment of this invention the new catalyst for the production of polyethylene terephthalate is having the chemical composition $C_4H_8O_9B_2Zn_4$ The instant invention is further related to the use of the catalyst described above for the production of polyethylene terephthalate. In this regard the invention is not limited to a particular production process but the new catalyst can instead be applied in any commercial process for the manufacture of polyethylene terephthalate, in particular to all such processes which are comprising an esterification step followed by a polycondensation step.

The catalyst of this invention is in particular suitable for the manufacture of high molecular weight PET. Hence a preferred embodiment of this invention is a method of manufacturing high molecular weight polyethylene terephthalate comprising the following steps:
  a) Polymerization of terephthalic acid, ethylene glycol and optionally isophthalic acid in the molten state in the presence of the catalysts described in this invention; and
  b) after reaching an intrinsic viscosity of at least 0.66 dL/g, solidifying the molten polymer and continuing the polymerization in the solid state until an intrinsic viscosity of at least 1.00 is reached.

The polyethylene terephthalate produced with a catalyst described in this patent is essentially free of any heavy metal contaminants and reveals positive product properties. The new zinc borate complex is found to act as a high performance catalyst in the PET polymerization reaction in respect to the reaction time. Nevertheless, it is found that the new complex structure has a good selectivity to other side reactions since the properties of the final product were in the optimal range compared with those of the conventional antimony catalysts.

Test Methods:
Intrinsic Viscosity:

The intrinsic viscosity or I.V. is a measure of the molecular weight of the polymer and is measured by dilute solution viscometry. All the I.Vs. here were measured in a 3:2 (wt/wt) mixture of phenol/1,2 di-chlorobenzene solution, at 25° C. The method is based on a single measurement at a single concentration. Typically, about 8-10 chips are dissolved to make a solution with a concentration of 0.5%. The I.V. was obtained from the measurement of relative viscosity ηr for a single polymer concentration (0.5%) by using the Billmeyer equation (see F. W. Billmeyer, J. of Polymer Science, 1949, IV, 83) shown below.

$$I.V.=[\eta]=0.25(\eta_r-1+3\ln\eta_r)/c \text{(valid for the range } c=0.5\text{-}0.65 \text{ g/dL)}$$

Colour:

The colour parameters were measured with a HunterLab ColorFlex Model No 45/0, serial No. CX 0969. Amorphous PET chips were used without grinding or crystallization, in the transparent state. The 'base polymer' had a grey tone and a yellow tint. The colour of the transparent amorphous chips was categorized using the CIE tristimulus L*, a* and b* values. L* indicates the brightness of the samples, with a high value signifying high brightness. L*=100 stands for perfectly white; L*=0 is perfectly black. The a* value indicates the greenness or redness of the sample (− value indicates greenness; + value indicates redness). The b* value indicates blueness or yellowness (− value indicates blue; + indicates yellow).

DEG:

To determine the DEG content, the PET was trans-esterified with methanol in an autoclave at 220° C. During this, the PET is depolymerised and the DEG is liberated as the diol. The liquid formed was analyzed by Gas Chromatography (GC) to determine the DEG content of the polymer, after suitable calibration.

COOH end groups. The PET was dissolved in a mixture of o-cresol and chloroform, under reflux conditions. After cooling to room temperature, the COOH end groups were determined using potentiometric titration with ethanolic KOH solution, under a nitrogen atmosphere. The results are expressed in mVal of COOH/kg of PET (milli equivalent of COOH per kg of PET).

Measurement of Acetaldehyde (AA) in Amorphous PET Chips and Residual Acetaldehyde in Solid State Polymerization (SSP) Chips:

The AA was measured by Head Space Gas Chromatography (GC), after cryogenic grinding of the polymer chips into a powder. 1 g of the powder was placed in a GC vial. The standard headspace-method was used for residual AA in resins, and involved heating the vial at 150° C. for 90 minutes, before injection in the GC column. The GC was calibrated with aqueous solutions of acetaldehyde of known concentrations.

Elemental Analysis:

Metal analysis was conducted using the ICP-Horiba Jobin YVON—Activa. The catalyst sample was solved in nitric acid and analyzed for the metal content relatively to a standard solution of the given metal. C, H, and N were determined using a CHN analyser Thermo Flash EA 1112 Series. The catalyst sample was used as solid placed in the instrument and then burned by a very high temperature and measured for the content of said elements.

EXAMPLES

Example 1

Synthesis of the Catalyst

Boric acid (10 g, 0.161 mol) was placed in a 500 ml 3-necked round bottom flask followed by addition of excess of ethylene glycol (100 ml). Boric acid dissolved easily upon increasing the temperature. The mixture was kept stirring at 140° C. for 1 hour under nitrogen purge. The mixture was cooled down to room temperature. Pre-dissolved zinc acetate dihydrate (70.8 g, 0.323 mol) in ethylene glycol (150 ml) was added to the flask. The temperature was raised gradually with stirring. The mixture was kept stirring with reflux at 140° C. Over the time, a white solid material started to precipitate. The reaction was kept under constant conditions for 3 hours. After that, the mixture was cooled down to room temperature and the product was left to settle down. Excess of ethylene glycol was decanted. The solid precipitate was washed repeatedly with a mixture of water/ethanol (50:50 v/v %). Finally, the product was washed with acetonitril and dried in an oven under nitrogen flow at 80° C. The product weight was 35.2 g and the yield was 90.3% based on zinc. An elemental analysis of the resultant product revealed the data listed in table 1 which is consistent with a structure comprising four zinc atoms bridging the organic ligand and the borate moieties and a sum composition of $C_4H_8O_9B_2Zn_4$.

TABLE 1

| Elemental Analysis | | | | |
|---|---|---|---|---|
| | Element | | | |
| | C (%) | H (%) | Zn (%) | B (%) |
| Calculated | 9.92 | 1.65 | 54.09 | 4.55 |
| Found | 9.30 | 1.22 | 55.10 | 4.50 |

Example 2

Melt Polymerization of PET Using the New Catalyst

The reaction was carried out in a 25 l stainless steel bench scale reactor jacketed and heated by high temperature silicone oil. The raw materials, Purified Terephthalic Acid (PTA) (6756 g, 40.7 mol), Ethylene Glycol (EG) (3358 g, 54.16 mol) and Isophthalic Acid (IPA) (160 g, 0.96 mol) (see Table-2), were charged into the reactor with continuous agitation. As color masking agents blue toner (Estofil blue manufactured by Clariant) (0.015 g) and cobalt acetate (0.5 g) were added at the beginning of the reaction. The new catalyst (0.25 g) (see Table-3) was added in the beginning as well. The charged materials were agitated at high speed and vented by nitrogen gas for 5 min. The reactor was then closed and the temperature was raised to 250° C. The agitation speed was increased to 100 rpm. The pressure inside the reactor was increasing over the time due to the vapor of EG and the formation of water. Once the pressure reached 7 bar, the valve of the exchange column was opened slightly to remove the water that was formed from the esterification reaction in order to support the further condensation of the excess EG. After the collection of the theoretical amount of water, the pressure was reduced to atmospheric pressure, phosphoric acid (0.91 g) was added into the reactor and the mixture was stirred for 2 min. The valve of the exchange column was then closed and the valve of the vacuum line was opened. The temperature was gradually increased to 275° C. to start the melt polymerization. The agitation speed was reduced to 60 rpm in this stage. The pressure inside the reactor was reduced gradually until a vacuum of 0.8 mbar was reached to remove the formed EG and other by-products. The progress of the reaction was monitored by torque measurement. At the point of reaching the desired intrinsic viscosity which corresponds to 12 N·m torque, the reaction was terminated and the polymer was pulled into strands, quenched in cooled water, and cut into small pellets.

TABLE 2

Raw Material (Amount in Moles)

| Component | | |
|---|---|---|
| PTA | EG | IPA (2 wt % wrt PET) |
| 40.7 | 54.16 | 0.96 |

Amount in Moles

TABLE 3

Quantities of other components
Table 3. Quantities of other components

| Component | Catalyst Based on Zinc | Cobalt Acetate Based on Cobalt | Phosphoric Acid Based on Phosphorus | Blue Toner |
|---|---|---|---|---|
| Quantity (ppm) wrt PET final product | 155 | 15 | 33 | 1.875 |

Examples 3, 4 and 5 and Comparative Examples C1 and C2

Solid State Polycondensation (SSP)

Solid state polymerization was performed in a horizontal basket reactor. The metal-basket was filled with 100 g of the chips obtained by the above melt polymerization and placed in the reactor (example 3). In parallel a metal basket filled with chips made with a standard antimony catalyst (antimony triacetate—see for example US2008033084A1) was placed in the reactor (example C1). Further parallel polycondensation reactions were performed with raw PET produced as in example 2 but with different amounts of the inventive catalyst being used (examples 4 and 5) or with Zn borate as a catalyst (example C2). A flow of nitrogen was kept constant at 3 l/min and the rotation speed was also fixed at 10 rpm. The reaction was programmed to follow a step wise increment of the temperature. The temperature was held at 100° C. for half an hour in order to dry the products. Then the temperature was kept constant again at 170° C. for half an hour as a pre-crystallization step. Finally, the reaction was performed at 210° C. and with flow of nitrogen for 12 hours.

Example 6, 7 and Comparative Examples C3 and C4

Melt Polycondesation of PET Using the New Catalyst for Obtaining High Molecular Weight PET Example 2 was repeated with the amounts of catalysts and under the conditions indicated in Table 7 and until the I.V. of the amorphous resin indicated in that table was reached. Table 8 shows the properties of the PET resin obtained at that stage.

Examples 8, 9 and Comparative Examples C5 and C6

Solid State Polycondensation (SSP) for Obtaining High Molecular Weight PET

Example 3 was repeated using PET chips obtained from examples 6, 7, C3 and C4. Table 7 shows the resulting intrinsic viscosity of the products obtained from such examples. Table 9 shows the properties of the PET resin obtained after the solid state polycondensation.

TABLE 4

Overall Reaction Time
(all ppm amount are w/w based on the final amount of PET)

| | STD Antimony Catalyst (280 ppm) (Ex. C1) | Zinc Borate (155 ppm) (Ex. C2) | New Catalyst (137.5 ppm) (Ex. 4) | New Catalyst (155 ppm) (Ex. 3) | New Catalyst (206 ppm) (Ex. 5) |
|---|---|---|---|---|---|
| Esterification Time (min) | 170 | 160 | 185 | 170 | 185 |
| To Reach Torque of 1 Time (min) | 93 | 115 | 89 | 74 | 50 |
| Polycondensation Time (min) | 77 | 90 | 60 | 50 | 36 |
| Overall Time (min) | 340 | 365 | 334 | 294 | 271 |

TABLE 5

Amorphous PET Chips (Analysis Data)

| Catalyst (ppm) | IV (dL/g) | AA (ppm) | COOH (meq/Kg) | DEG (%) | Color L* | Color a* | Color b* |
|---|---|---|---|---|---|---|---|
| STD Antimony 280 (Ex. C1) | 0.54 | 75.1 | 43.5 | 2.9 | 61.83 | −2.49 | 3.11 |
| Zinc Borate 155 (Ex. C2) | 0.535 | | | | 66.93 | −0.77 | 9.97 |
| New Catalyst 137.5 (Ex. 4) | 0.541 | 63.73 | 40.4 | 2.6 | 70.32 | −3.07 | −3.72 |
| New Catalyst 155 (Ex. 3) | 0.532 | 42.84 | 38.4 | 2.68 | 69.78 | −2.63 | −2.64 |
| New Catalyst 206 (Ex. 5) | 0.63 | 63.63 | 47 | 2.97 | 68.87 | −0.08 | 3.35 |

TABLE 6

Solid State Resin (Analyses Data)

| Catalyst (ppm) | IV (dL/g) | AA (ppm) | COOH (meq/Kg) | DEG (%) | Color L* | Color a* | Color b* |
|---|---|---|---|---|---|---|---|
| STD Antimony 280 (Ex. C1) | 0.822 | 0.07 | 25.4 | 3.16 | 87.25 | −1.06 | 4.34 |
| Zinc Borate 155 (Ex. C2) | 0.701 | | | | 83.02 | −0.91 | 7.61 |
| New Catalyst 137.5 (Ex. 4) | 0.807 | 0.61 | 35.6 | 2.7 | 87.13 | −2.41 | −0.45 |
| New Catalyst 155 (Ex. 3) | 0.828 | 0.54 | 16.5 | 2.73 | 88.21 | −2 | 1.1 |
| New Catalyst 206 (Ex. 5) | 0.909 | 3.66 | 38.5 | 2.61 | 88.73 | −0.55 | 4.54 |

TABLE 7

Results for the production of high molecular weight PET

| Catalyst (ppm) | Melt. Poly. Time (min) | SSP time (hr) | Amorpous Resin IV (dL/g) | Resin after SSP IV (dL/g) | Delta IV (dL/g) |
|---|---|---|---|---|---|
| STD Antimony 280 (Ex. C3) | 50 | 16 | 0.53 | 0.804 | 0.274 |
| New Catalyst 155 (Ex. 6) | 50 | 16 | 0.532 | 0.828 | 0.296 |
| STD Antimony 280 (Ex. C4) | 100 | 16 | 0.669 | 1.015 | 0.346 |
| New Catalyst 200 (Ex. 7) | 61 | 16 | 0.658 | 1.017 | 0.359 |

TABLE 8

Properties of high molecular weight PET (After Melt Polycondensation)

| Catalyst (ppm) | Color L* | Color a* | Color b* | DEG % | AA ppm | COON Mval./mol |
|---|---|---|---|---|---|---|
| STD Antimony 280 (Ex. C3) | 65.45 | −0.26 | 3.75 | 2.14 | 25.86 | 14 |
| New Catalyst (Ex. 6) 155 | 69.78 | −2.63 | −2.64 | 2.68 | 42.84 | 38.4 |
| STD Antimony 280 (Ex. C4) | 61.18 | −0.62 | 5.74 | 2.1 | 22.53 | 21.7 |
| New Catalyst 200 (Ex. 7) | 64.1 | −0.65 | 1.3 | 2.42 | 77.5 | 49.5 |

TABLE 9

Properties of high molecular weight PET (After Solid State Polycondensation)

| Catalyst (ppm) | Color L* | Color a* | Color b* | DEG % | AA ppm | COOH Mval./mol |
|---|---|---|---|---|---|---|
| STD Antimony 280 (Ex. C5) | 86.01 | −1.04 | 3.59 | 2.14 | 0.085 | 16 |
| New Catalyst 155 (Ex. 8) | 88.21 | −2 | 1.1 | 2.73 | 0.54 | 16.5 |
| STD Antimony 280 (Ex. C6) | 82.1 | −1.37 | 6.21 | 2.19 | 0.94 | — |
| New Catalyst 200 (Ex. 9) | 84.24 | −0.78 | 3.66 | 2.95 | 0.26 | 32.9 |

The invention claimed is:

1. A process of preparing a catalyst for the production of polyethylene terephthalate comprising:

reacting boric acid and a zinc salt in a solvent comprising at least one glycol selected from ethylene glycol, propylene glycol, and butylene glycol, thereby forming a precipitate; and isolating the precipitate.

2. The process according to claim 1, wherein the boric acid is solved in the solvent to form a solution, and the zinc salt is combined with the solution either in solid form or in the form of a zinc solution in the solvent.

3. The process according to claim 1, wherein the reaction between the boric acid and the zinc salt is performed under inert atmosphere.

4. The process according to claim 1, wherein the reaction between the boric acid and the zinc salt is performed at a temperature of 100° C. to the boiling temperature of the solution.

5. The process according to claim 1, wherein the molar ratio between boric acid and zinc is between 0.3 and 0.7.

6. A process of preparing a catalyst for the production of polyethylene terephthalate comprising:
   forming a boric acid solution of boric acid solved in a solvent comprising at least one glycol selected from ethylene glycol, propylene glycol, and butylene glycol;
   combining the boric acid solution and the zinc salt to form a reaction solution;
   reacting the reaction solution under an inert atmosphere and at a temperature of 100° C. to the boiling temperature of the reaction solution to form a precipitate; and
   isolating the precipitate.

7. The process according to claim 6, wherein the zinc salt is solved in the solvent to form a zinc solution before combining the zinc salt with the boric acid solution.

8. The process according to claim 6, wherein the molar ratio between boric acid and zinc is between 0.3 and 0.7.

9. The process according to claim 6, wherein the precipitate has the chemical composition $C_4H_8O_9B_2Zn_4$.

10. A catalyst for the production of polyethylene terephthalate obtainable by a process comprising
    reacting boric acid and a zinc salt in a solvent comprising at least one glycol selected from ethylene glycol, propylene glycol, and butylene glycol, thereby forming a precipitate; and
    isolating the precipitate.

11. The catalyst according to claim 10, having the chemical composition $C_4H_8O_9B_2Zn_4$.

12. A catalyst for the production of polyethylene terephthalate having the chemical composition $C_4H_8O_9B_2Zn_4$.

13. A method of manufacturing polyethylene terephthalate comprising:
    polymerization of terephthalic acid, ethylene glycol and optionally isophthalic acid in the molten state in the presence of a catalyst, wherein the catalyst was obtained by a process comprising
        reacting boric acid and a zinc salt in a solvent comprising at least one glycol selected from ethylene glycol, propylene glycol, and butylene glycol, thereby forming a precipitate; and
        isolating the precipitate; and
    after reaching an intrinsic viscosity of at least 0.66 dL/g, solidifying the molten polymer and continuing the polymerization in the solid state until an intrinsic viscosity of at least 1.00 is reached.

14. The method according to claim 13, wherein the catalyst has the chemical composition $C_4H_8O_9B_2Zn_4$.

15. Polyethylene terephthalate produced according to claim 13.

* * * * *